Aug. 16, 1966  R. H. GOSNEY  3,266,090

MELT CUTTER APPARATUS

Filed Nov. 4, 1964

INVENTOR
ROBERT HOWARD GOSNEY

BY *Harry E. Braddock*
ATTORNEY

United States Patent Office 3,266,090
Patented August 16, 1966

3,266,090
MELT CUTTER APPARATUS
Robert Howard Gosney, Orange, Tex., assignor to E. I. du Pont de Nemours and Company, Wilmington, Del., a corporation of Delaware
Filed Nov. 4, 1964, Ser. No. 408,802
8 Claims. (Cl. 18—12)

This invention relates generally to the field of forming pellets, or granules, from extruded strands of a plastic material.

More specifically, this invention involves an improved rotary cutter apparatus cooperating with a die structure defining one or more melt extrusion orifices and preferably adapted for operation while submerged in a liquid medium to cool the material which usually is extruded through the orifices in molten form.

It has been found, in working with conventional melt cutter devices, that the maintenance of the cutter element-to-die clearance is very important and critical for proper cutting action. If this clearance becomes too large, poor and incomplete cutting action results; conversely, if the clearance is reduced to zero, severe knife and die wear occurs. Two factors which affect the cutter element-to-die clearance are thermal expansion and wear of associated parts. Good alignment between the cutter device and the cooperating die structure is also important in maintaining the desired clearance.

Therefore, an object of this invention is the provision of an improved melt cutter apparatus for producing thermoplastic pellets or granules of uniform size and shape. A particular object is the provision of a liquid phase melt cutter apparatus which will function effectively for long periods of time with a minimum of knife and die wear, a minimum of die scoring, and a minimum of adjustment or servicing during operating life of the apparatus.

The above and other objects are accomplished by the novel features of the present invention which will become apparent from the following description, having reference to the annexed drawings wherein.

Like reference numerals indicate like parts throughout the several views of the drawings.

Figure 1:
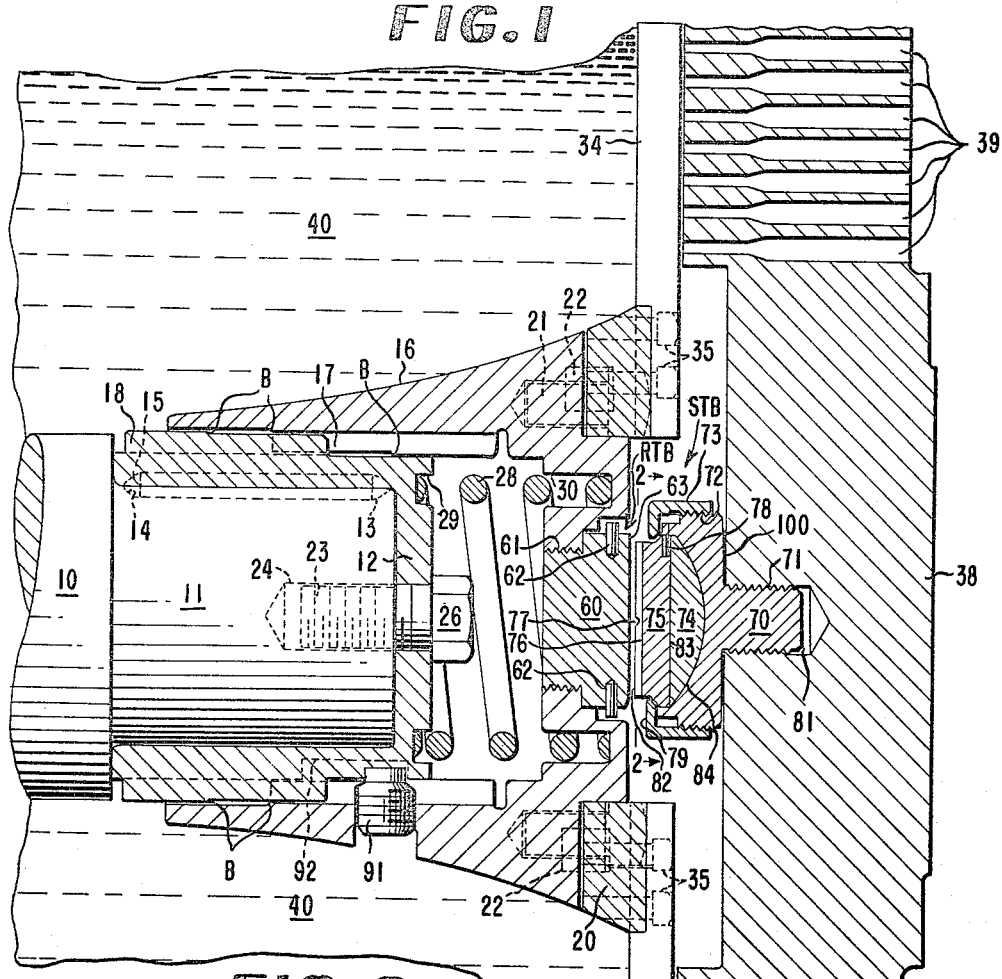
FIGURE 1 is a side elevation, partly in section of the melt cutter apparatus, with certain parts broken away to more clearly show cooperation of the members of the apparatus.

The process for extruding and cutting a molten thermoplastic resin into the form of discrete pellets or granules, accomplished with the aid of the improved melt cutter apparatus of the present invention, comprises continuous extrusion of strands of the molten thermoplastic resin through one or more orifices, formed in a planar die face, directly into a cooling liquid, and cutting the extruded strand(s) within the cooling liquid into pellets or granules as the latter are undergoing solidification.

The objects of the present invention are accomplished by the use of an improved rotary melt cutter apparatus for producing pellets from a strand or strands of a partly molten thermoplastic resin in cooperation with an extrusion die, said extrusion die having a planar die surface intersected by one or more extrusion orifices, said improved rotary melt cutter apparatus adapted to be driven rotationally by a rotating shaft structure, means for connecting said rotating shaft structure to a rotating knife holder assembly, said rotating knife holder assembly mounted planar die surface and said orifices of said extrusion die such that the plane of rotation of said rotating knife holder assembly is maintained adjacent and in alignment parallel to said planar die surface and said orifices so that substantially no amount of wear occurs on the knives or die, means for urging said rotating knife holder assembly axially toward said planar die surface and said orifices, and limiting stop and thrust bearing means, a portion of said means mounted on said rotating shaft structure and another portion mounted on the die structure and both portions cooperating to limit the movement of said rotating knife holder assembly toward said planar die surface and prevent wear of knife and die parts for long periods of time.

The present invention is considered to be a significant improvement over the melt cutter apparatus disclosed in the common assignee's copending application Serial No. 296,042, filed July 18, 1963, now Patent No. 3,196,487. This application is believed to be the closest prior art, over which the cutting apparatus of the present invention represents a patentably distinguishable advance.

In cutter apparatus of the type referred to in the above-mentioned application, one problem was related to the fact that the stop element which controlled knife edge to die face clearance was mounted on the drive shaft structure which carried the knives. This meant that variations in length or position of the drive shaft structure such as would be caused by thermal expansion of parts would directly vary the position of the stop element and hence the knife-to-die clearance. This is one of the deficiencies of the prior practice which is overcome by the improved cutter embodying principles of the present invention in which the stop element controlling knife-to-die clearance is mounted independently of the drive shaft structure as will be described in detail hereinafter.

Referring now to the drawings, there is shown therein a portion of the rotating drive shaft 10 which is provided with a reduced portion 11. Shaft 10 may be axially positioned by means of an adjustment mechanism (not shown) cooperating with the shaft. The rotational movement of the reduced portion of the drive shaft 11 is transmitted to an inner cap member 12 by means of a connecting key 13, which is positioned in a keyway formed by axially aligned, corresponding slots 14 and 15 in the reduced portion of the drive shaft 11 and in the inner cap member 12, respectively. The rotational movement of the inner cap member 12 is in turn transmitted to an outer sleeve member 16 by means of a plurality of circumferentially spaced and axially extended splines 17 located on the interior periphery of the outer sleeve member 16 with a corresponding plurality of circumferentially spaced and axially extended splines 18 located on the exterior periphery of the inner cap member 12. Radially enlarged portions B are provided as shown on the spline elements to help maintain perpendicularity of the knives 34 with the shaft 10 and concentricity between the shaft and sleeve member 16. This splined connection between the members also allows axial movement of the outer sleeve member 16 and the knife holder assembly 20. The knife holder assembly 20 is secured to the outer sleeve member 16 by bolts 21 and by dowel pins 22, thus allowing transmission of the rotational movement from the outer sleeve member 16 as well as the above-mentioned axial movement to the knife holder assembly 20. A stud bolt 23, which is threadably received into a recess 24 formed in the reduced part of the drive shaft 11, is provided with hexagonal head 26 which holds the inner cap member 12 tightly against the reduced portion of the drive shaft 11. Axial movement of outer sleeve member 16 with respect to inner sleeve member 11 is limited by the movement of radially extending machine screw 91 mounted on outer sleeve member 16 and projecting inwardly into slot 92 formed in the exterior of inner sleeve member 11. A helical spring 28 is positioned between the annular recess 29 of the inner cap member 12 and the annular recess 30 of outer sleeve member 16 to urge the outer sleeve member and knife holder assembly toward an extended position.

Figure 2:
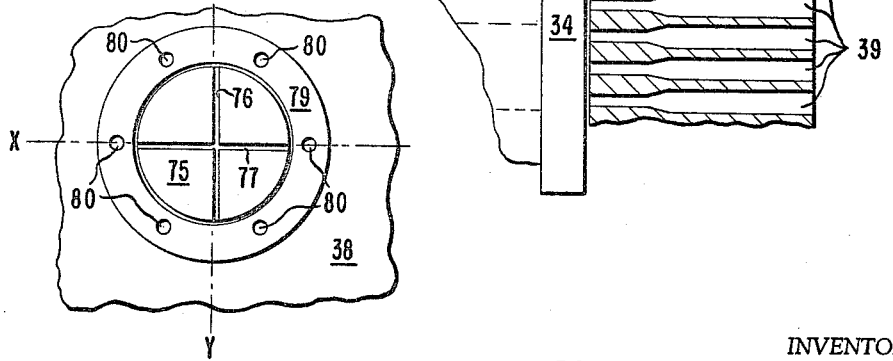
FIGURE 2 is an end view of part of the thrust bearing device of the melt cutter apparatus of FIGURE 1 taken on the line 2—2 of FIGURE 1.

A rotary thrust bearing unit RTB is mounted at a central location on outer sleeve member 16 as shown and engages a stationary thrust bearing unit STB which is aligned therewith and secured in position on die face 38. Rotary thrust bearing unit RTB comprises a hardened steel plug element 60 having a threaded portion 61 for engagement in a threaded recess in outer sleeve member 16. Plug element 60 is screwed into this recess by means of a spanner wrench which engages a plurality of circumferentially spaced radially extending pins 62 positioned around the plug element periphery. Plug element 60 is also provided with a precision formed planar bearing face 63 for engagement with the stationary thrust bearing unit. Stationary thrust bearing device STB comprises a stud element 70 threadably received at one end in a recess 81 in the die face 38. At its other end, stud element 70 has an enlarged threaded portion in the end of which is formed a central recess provided with a bottom having a spherical surface 84. Mounted in this central recess is a first bearing element 74 having a flat face 83 and a spherical surface mating with the spherical bottom of the central recess of stud element 70. Also mounted in the central recess against the flat face 83 of the first bearing element 74 is a second bearing element 75. The first and second bearing elements 74 and 75 are secured in position by an annular cap 73, threadably received on the outer surface of the enlarged end portion of stud element 70. Preferably, these elements are loosely secured in position to allow limited movement. A portion of the second bearing element 75 projects through the opening in annular cap 73 and is provided with a bearing face 82 opposed to and aligned with bearing face 63 on the rotary thrust bearing unit. This bearing face 82 and preferably the entire second bearing unit 75 is formed of a very hard wear-resistant material such as, for example, is formed by highly heated and compacted carbon and graphite powders. Tungsten carbide, aluminum oxide, chromium carbide, zirconium oxide, and other similar materials also could be used. This bearing face 82 is precision formed into a planar surface which engages the bearing face 63 of the rotary thrust bearing unit, and is provided with two cross slots 76 and 77 both of which preferably are formed off-center as shown in FIGURE 2 to insure a uniform wiping and cleaning action of the bearing faces during operation of the device. These slots also accomplish a cooling function to prevent over-heating of the bearing faces. These bearing units can be axially positioned by the threaded engagement of plug 60 and stud 70 with their supporting structures. In addition annular shims 100 can be placed as needed between the enlarged head of stud 70 and the die face 38. Rotation of the second bearing element 75 of the stationary thrust bearing unit STB is prevented by a radial pin 78 mounted in the stud element recess and projecting into a radial slot in the periphery of the second bearing element 75. The knife holder assembly 20 is held firmly against the stationary thrust bearing unit STB by virtue of spring force transmitted by the outer sleeve member 16 and the rotary thrust bearing unit RTB, and possesses a number of circumferentially spaced and outwardly extending knife elements 34. The knife elements 34 are secured in place by any suitable means e.g. by threaded bolts 35, in the knife holder assembly 20. The edges of the knife elements 34 are positioned adjacent to the die face 38 and the extrusion orifices 39 and rotate in a plane parallel to the planar die face 38.

FIGURE 1 shows the entire melt cutter assembly submerged in a cooling liquid 40.

Before operating the apparatus of the present invention, the drive shaft is moved axially toward the die face causing the rotary thrust bearing to contact the stationary thrust bearing. The drive shaft is further moved to preload spring 28 the desired amount. Preferably by adjusting the size or number of shims 100, the desired knife-to-die relationship is attained.

As a melt cutter apparatus is operated, knife element-to-die face contact and wear of the knives and die face is prevented by the engagement of bearing faces 82 and 63. Since these faces are formed from extremely hard material precisely formed to give maximum smoothness and cooled to prevent overheating, wear of either bearing face is negligible over long periods of operation. This maintains the desired small knife-to-die clearance without contact which gives optimum cutting action. In addition, thermal expansion of the drive structure cannot affect the knife-to-die clearance but is taken up by relative movement between sleeve members 16 and 11 against spring 28. As has been mentioned, the knife element-to-die face clearance is critical for proper cutting action. In general, the closer the clearance without contact the more complete and uniform the cut obtained without die-knife wear. The attainment of a slight but fixed blade-to-die face clearance and its maintenance over long periods of operation insures the production of pellets or granules of uniform dimension.

Slight swiveling action of the bearing elements 74 and 75 of the stationary thrust bearing unit STB allowed by spherical surface portion 84, maintains face to face planar contact between elements 60 and 75 as spring 28 urges these parts together. This minimizes the need for precise alignment of the stationary thrust bearing unit STB and the die face. The plane of rotation of the knife elements is maintained parallel to the surface of the die face, by control of the shaft structure and to die face relationship, and the knife-to-die clearance is maintained by the thrust bearing units to ensure the uniformity of the cutting action and substantially no wear of the relatively moving parts during normal operation periods.

The cooling liquid, when used with the melt cutter apparatus of the present invention is kept at a temperature below its boiling point and below that temperature at which the cut granules or pellets stick together. Furthermore, the liquid should be non-reacting with the thermoplastic and of any convenient viscosity. The pellets are then removed by any suitable means and dried.

Other modifications within the spirit of this invention will become apparent from the foregoing detailed description, and the invention is to be limited only to the extent indicated in the following patent claims.

What is claimed is:

1. An improved rotary melt cutter apparatus for producing pellets from a strand or strands of a partly molten thermoplastic resin in cooperation with an extrusion die, said extrusion die having a planar die surface intersected by one or more extrusion orifices, said improved rotary melt cutter apparatus adapted to be driven rotationally by a rotating shaft structure, means for connecting said rotating shaft structure to a rotating knife holder assembly, said rotating knife holder assembly mounted and supported on said shaft and in cooperative association with said planar die surface and said orifices of said extrusion die such that the axis of rotation of said holder assembly is substantially perpendicular to the planar die surface and such that the plane of rotation of said rotating knife holder assembly is maintained adjacent and in alignment parallel to said planar die surface and said orifices, means for urging said rotating knife holder assembly axially toward said planar die surface and said orifices, and adjustable thrust bearing means cooperating with the die surface and knife holder assembly to limit the movement of said rotating knife holder assembly toward said planar die surface and maintain a predetermined knife-to-die clearance without wear for long operating periods independently of shaft structure movement.

2. The improved rotary melt cutter apparatus of claim 1, wherein the means for connecting the rotating shaft structure to the rotating knife holder assembly transmits the rotational movement of said rotating shaft structure to said rotating knife holder assembly and is comprised of an inner member, said inner member carried by said rotating shaft structure, and loosely connected to an outer sleeve member, said outer sleeve member rigidly fixed to said rotating knife holder assembly.

3. The improved rotary melt cutter apparatus of claim 2, wherein the inner member is connected to the outer sleeve member by means of a plurality of circumferentially spaced and axially extended splines, said splines located on the outer and inner peripheral surfaces, respectively, of said inner cap member and said outer sleeve member, and spaced sufficiently apart to allow said outer sleeve member a degree of axial movement, said outer sleeve member rigidly fixed to the rotating knife holder assembler, said degree of axial movement transmitted to said rotating knife holder assembly.

4. The improved rotary melt cutter apparatus of claim 1, wherein the means for urging the rotating knife holder assembly toward the planar die surface and extrusion orifices comprises resilient means.

5. The improved rotary melt cutter apparatus of claim 4, wherein the resilient means is comprised of a spring acting between the rotating shaft structure and the rotating knife holder assembly.

6. The improved rotary melt cutter apparatus of claim 1, wherein the adjustable thrust bearing means comprises a stationary thrust bearing unit having a wear resistant hardened bearing face and mounted on the die surface and a rotary thrust bearing unit having a wear resistant hardened bearing face aligned and in full contact with said bearing face of said stationary unit, said rotary thrust bearing unit mounted on said knife holder assembly, said engaged bearing faces cooperating to maintain a predetermined knife-to-die clearance during operation of the apparatus.

7. The improved apparatus of claim 6 in which one of said bearing faces is provided with means for liquid cooling and cleaning of said surfaces during operation of the apparatus.

8. The improved apparatus of claim 7 in which one of said units comprises structure defining means for permitting a limited swiveling action between the bearing face of that unit and the structure on which that unit is mounted during operation of the apparatus.

References Cited by the Examiner

UNITED STATES PATENTS

| | | | |
|---|---|---|---|
| 2,401,236 | 5/1946 | Fielitz | 18—12 |
| 3,029,466 | 4/1962 | Guill | 18—12 |
| 3,164,862 | 1/1965 | Zies | 18—12 |
| 3,196,487 | 7/1965 | Snelling | 18—12 |

FOREIGN PATENTS

| | | |
|---|---|---|
| 1,148,154 | 6/1957 | France. |

WILLIAM J. STEPHENSON, *Primary Examiner.*